United States Patent
Bar-Ness et al.

(10) Patent No.: US 9,191,154 B2
(45) Date of Patent: Nov. 17, 2015

(54) METHOD AND/OR SYSTEM FOR ESTIMATING PHASE ERROR NOISE

(75) Inventors: Yesheskel Bar-Ness, Marlboro, NJ (US); Pan Liu, Kearny, NJ (US)

(73) Assignee: New Jersey Institute of Technology, Newark, NJ (US)

(*) Notice: Subject to any disclaimer, the term of this patent is extended or adjusted under 35 U.S.C. 154(b) by 890 days.

(21) Appl. No.: 13/110,989

(22) Filed: May 19, 2011

(65) Prior Publication Data

US 2011/0222639 A1    Sep. 15, 2011

Related U.S. Application Data

(63) Continuation of application No. 11/293,874, filed on Dec. 2, 2005.

(60) Provisional application No. 60/632,439, filed on Dec. 2, 2004.

(51) Int. Cl.
   - H04L 25/03 (2006.01)
   - H04L 1/00 (2006.01)
   - H04L 1/06 (2006.01)
   - H04L 5/00 (2006.01)
   - H04B 7/04 (2006.01)
   - H04L 27/26 (2006.01)

(52) U.S. Cl.
   CPC ............ *H04L 1/0045* (2013.01); *H04L 1/0606* (2013.01); *H04L 5/0023* (2013.01); *H04B 7/04* (2013.01); *H04L 1/0631* (2013.01); *H04L 25/03006* (2013.01); *H04L 27/2647* (2013.01); *H04L 2025/03426* (2013.01)

(58) Field of Classification Search
   USPC ......... 375/148, 285, 299, 347, 349, 346, 348; 455/132, 101
   See application file for complete search history.

(56) References Cited

U.S. PATENT DOCUMENTS

| | | | |
|---|---|---|---|
| 6,862,440 B2 | 3/2005 | Sampath | |
| 7,286,514 B2 * | 10/2007 | Bar-Ness et al. | 370/338 |
| 7,408,976 B1 | 8/2008 | Narasimhan et al. | |
| 2003/0224750 A1 | 12/2003 | Sampath | |
| 2004/0171366 A1 * | 9/2004 | Bar-Ness et al. | 455/278.1 |
| 2007/0081606 A1 * | 4/2007 | Rosenfeld | 375/267 |

OTHER PUBLICATIONS

Schenk et al, ("Influence and suppression of Phase Noise in Multi-Antenna OFDM". Proc. IEEE Vehicular Technology Conference Sep. 26-29, 2004.*

Petrovic et al. ("Phase Noise Suppression in OFDM including Intercarrier Interference," in Proc. Intl. OFDM Workshop (InOWo)03, 2003, pp. 219-223).*

Petrovic et al. (Intercarrier Interference due to Phase Noise in OFDM—Estimation and Suppression) in Proc. Of VTC'04 Fall, Los Angeles, pp. 2191-2195, 2004.*

Denis Petrovic, Wolfgang Rave and Gerhard Fettweis, Phase Noise Suppression in OFDM Including Intercarrier Interference, Dresden University of Technology, HelmholtzstraBe 16.*

Petrovic et al. ("Phase Noise Suppression in OFDM including Intercarrier Interference"), in Proc. Intl. OFDM Workshop (InOWo) 03, 2003, pp. 219-223.

Schenk et al. ("Influence and Suppression of Phase Noise in Multi-Antenna OFDM"), Proc. IEEE Vehicular Technology Conference, Sep. 26-29, 2004.

* cited by examiner

*Primary Examiner* — Jaison Joseph
(74) *Attorney, Agent, or Firm* — Panitch Schwarze Belisario & Nadel LLP

(57) ABSTRACT

Embodiments of methods and/or systems for estimating phase error noise are disclosed.

19 Claims, 5 Drawing Sheets

METHOD AND/OR SYSTEM FOR ESTIMATING PHASE ERROR NOISE

RELATED APPLICATION

The current patent application is a continuation of U.S. patent application Ser. No. 11/293,874, filed on Dec. 2, 2005, which is incorporated by reference herein, and which claims priority to U.S. provisional application No. 60/632,439, filed Dec. 2, 2004, titled "Minimal Mean Square Error-based Phase Noise Migration Method for MIMO-OFDM," assigned to the assignee of the presently claimed subject matter.

FIELD

This disclosure is related to communications.

BACKGROUND

It is desirable in communications to have the ability to estimate and adjust for phase error or phase noise, at least in part.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
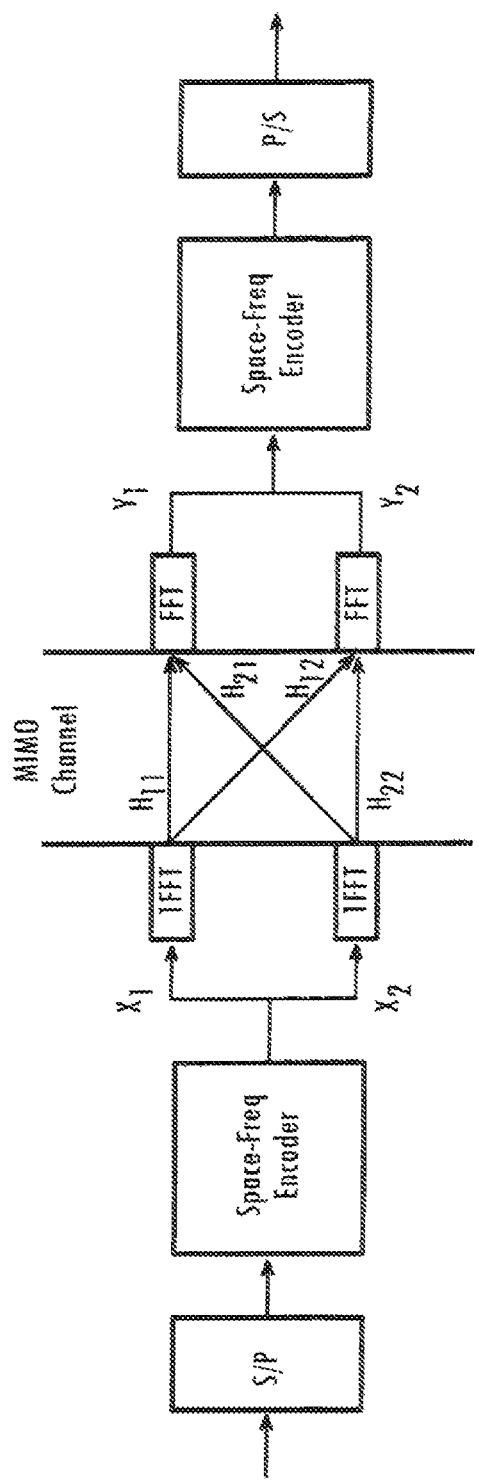
FIG. 1 is a schematic diagram illustrating an embodiment of a communications system employing an MIMO-OFDM scheme.

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading toe desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or, other information storage, transmission, and/or display devices.

For one embodiment in accordance with claimed subject matter, an MMSE-based scheme for estimating phase error noise is applied to an MIMO-OFDM communication system, such as systems with any number of antennas. Such an embodiment, it is believed provides better performance than what has been obtained with other phase error estimating approaches, such as a least squares (LS) approach, and shows robustness with respect to both number of antennas and SNR levels. Likewise, such as approach may be applied independent of coding scheme, and, therefore, may be used in various applications, such as BLAST or space-time coding, for example.

The combination of OFDM modulation with multiple input multiple output (MIMO) systems, may increase the system capacity and reduce receiver complexity, such as for time-variant and frequency-selective channels, for example. Therefore, MIMO-OFDM has become a promising candidate for high performance future 4G broadband wireless communications. However, similar to SISO-OFDM, MIMO-OFDM may be sensitive to the level of noise, such as phase error noise, which may result in performance degradation.

Even though various phase noise adjustment methods for single-antenna systems exist, multi-antenna communications systems have not been well-studied. As previously alluded to, for one embodiment, a Minimal Mean Square Error (MMSE)—based approach may be applied to an MIMO-OFDM communication system to estimate phase error noise, although, of course, claimed subject matter is not limited in scope in this respect. In particular, simulation results are shown herein for 64 sub-carriers, 16QAM modulation, with phase noise variance of 0.01.

A Multiple Input Multiple Output (MIMO) technique takes advantage of the diversity that may obtained by spatially separated antennas in a dense multi-path scattering environment, although claimed subject matter is not limited in scope in this respect. However, see, for example, D. Gesbert and et al., "From theory to practice: an overview of MIMO space-time coded wireless systems," IEEE J. Select. Areas Commun., vol. 21, pp. 281-297, April 2003 (hereinafter referred to as [1]). MIMO may provide a linear increase in the transmission rate (or capacity), potentially for the same bandwidth and potentially with no additional power expenditure. Diversity may, for example, be achieved through so called space-time codes. See, for example, e, V. Tarokh and A. Seshadri, "Space-time codes for high data rate wireless communication: Performance criterion and code construction," IEEE Trans. Inform. Theory, vol. 44, pp. 744-765, March 1998 (hereinafter referred to as [2]), while high bit rates may be achieved by spatial multiplexing systems, such as the pioneer system from Bell Labs abbreviated as BLAST. See, for example P. W. Wolniansky, G. J. Foschini, G. D. Golden, and R. A. Valenzuela, "V-BLAST: An architecture for realizing very high data rates over rich-scattering wireless channel,"

PROC. ISSSE, pp. 295-300, 1998 (hereinafter referred to as [3]). However, again, claimed subject matter is not limited in scope to these illustrative system examples.

Orthogonal frequency division multiplexing (OFDM) is an attractive modulation scheme used in broadband wireless systems which encounter large delay spread, for example, although, again, claimed subject matter is not limited in scope in this respect. Nonetheless, see, for example, Z. Wang and G. B. Giannakis, "Wireless multicarrier communications: Where fourier meets Shannon," Signal Processing Magazine, IEEE, vol. 17, pp. 29-48, May 2000 (hereinafter [4]), "OFDM or single-carrier block transmission?" Transaction or Communication, IEEE, vol. 52, pp. 380-394, March 2004 (hereinafter [5]). Thus, OFDM has been adopted in a variety applications, e.g., digital subscriber line (DSL), digital video/audio broadcasting (DVB/DAB), IEEE 802.11a wireless local area network (HIPERLAN/2); see, for example, J. Bingham, "Multicarrier modulation for data transmission: an idea for whose time has come," IEEE Commun. Mag., vol. 28, pp. 5-14, May 1990 (hereinafter [6]); IEEE Std 802.11a-1999, Supplement to IEEE standard for information technology—telecommunications and information exchange between systems—local and metropolitan area networks—specific requirements. Part 11; wireless LAN medium access control (MAC) and physical layer (PHY) specifications; high-speed physical layer in the 5 GHz band. http://www.ieee.org. December 1999 (hereinafter [7]).

A principle of OFDM is to convert a frequency-selective channel into a parallel collection of frequency flat sub-channels. The signal may then be recovered by a one-tap equalizer on each flat sub-channel, for example. Since the different subcarriers overlap in frequency, the available bandwidth is used efficiently.

A combined MIMO-OFDM scheme has an advantage over conventional systems at least in part due to its improved system capacity of BER performance introduced by MIMO technique, and its robustness to channel frequency selectively due at least in part to an OFDM technique. However, similar to OFDM, MIMO-OFDM suffers performance degradation due at least in part to the presence of phase noise. As previously suggested, in one embodiment, an MMSE-based approach to estimating phase error may be employed to improve system performance, such as may be employed at a receiver or by a computing device incorporated in a receiver, for example. Although, again, claimed subject matter is not limited in scope to these particular embodiments.

Consider a frequency selective MIMO channel with $M_T$ (also denoted MT herein) transmit antennas and $M_R$ (also denoted MR herein) receive antennas. The channel on sub-carrier k may be represented by $M_R \times M_T$ matrix H(k). Define $X=[X_1, X_2 \ldots, X_{MT}]^T=[X(0), X(1), \ldots, X(N-1)]$ as a $M_T$-by-N matrix which comprises transmitted data for one symbol duration T, where $X_t=[X_t(0), X_t(1), \ldots X_t(N-1)]^T$ denotes a transmitted OFDM symbol on t-th antenna, and $X(k)=[X_1(k), X_2(k), \ldots, X_{MT}(k)]^T$ denotes transmitted data for the antennas on sub-carrier k, which is between 0 and N−1. The IDFT of the data block on a transmit antenna yields the time domain sequence $x_t=[x_t(0), x_t(1), \ldots x_t(N-1)]^T$. After inserting Cyclix prefix (CP) which is assumed to be greater than the channel length, the sequence is transmitted over the transmit antennas. At the receive antennas, the CP is stripped off and data is fed into a DFT unit. By using CP in the data sequence, the time domain linear convolution is equivalent to cyclic convolution. Assume $Y=[Y_1, Y_2, \ldots, Y_{MR}]^T=[Y(0), Y(1), \ldots Y(N-1)]$ denotes received data from an antenna, where $Y_r=[Y_r(0)Y_r(1), \ldots, Y_r(N-1)]^T$ denotes a received OFDM symbol on r-th antenna, and $Y(k)=[Y_1(k),$ $Y_2(k), \ldots, Y_{MR}(k)]^T$ denotes the received signal on k-th sub-carrier. Hence, the general form of an MIMO-OFDM process may be summarized as:

$$Y(k) = \sqrt{\frac{E_s}{M_T}} H(k)X(k) + N(k) \quad (1)$$

where $E_s$ is the average energy allocated to the k-th sub-carrier evenly divided across the transmit antennas, H(k) is a $M_R \times M_T$ matrix which is given by:

$$H(k) = \begin{bmatrix} H_{11}(k) & H_{12}(k) & \ldots & H_{1M_T}(k) \\ H_{21}(k) & H_{22}(k) & \ldots & H_{2M_T}(k) \\ \vdots & \vdots & \ddots & \vdots \\ H_{M_R1}(k) & H_{M_R2}(k) & \ldots & H_{M_RM_T}(k) \end{bmatrix}$$

and $N(k)=[N_1(k), N_2(k), \ldots, N_{MR}(k)]^T$ denotes the noise on sub-carrier k which are zero-mean AWGN with the variance $\sigma^2_N$.

Several space-time coding techniques have been proposed, such as discussed in previously cited [2], and later were extended to the OFDM field. Of course, claimed subject matter is not limited to a particular coding scheme. Another interesting approach is space-frequency coding technique, introduced in Lee and Williams, "A space-frequency transmitter diversity technique for ofdm systems," GLOBECOM'00 (San Francisco, Calif.), vol. 3, pp. 1473-1477, November 2000, (hereinafter [8]) with 2×1 ($M_T=2, M_R=1$) antennas, which is the frequency domain counterpart of Alamouti's space-time coding technique, see Alamouti, "A simple transmitter diversity scheme for wireless communications," IEEE J. Select. Areas Commun., Vol. 16, pp 1451-1458, October 1998 (hereinafter [9]). Following the same method as in [8], the effect of phase noise using a 2×2 scenario is shown in FIG. 1. In order to implement the transmit diversity technique in [8], for example, $X_1$ and $X_2$ are encoded in bits as:

$$X_1 = [X(0), -X^*(1), \ldots, X(N-2), -X^*(N-1)]^t \quad (2)$$

$$X_2 = [X(1), X^*(0), \ldots, X(N-1), X^*(N-2)]^T \quad (3)$$

For the sake of simplicity, we assume $$\sqrt{\frac{E_s}{M_t}} = 1.$$

Hence from (1), the scalar form for A 2×2 case is given by:

$$Y_r(k) = \sum_{t=1}^{2} H_{tr}(k)X_t(k) + N_r(k) \quad r = 1, 2 \quad (4)$$

where $X_t(k)$ is the (k+1)th element of $X_t$.

The space-frequency transmit diversity technique [8] involves A fading channel on adjacent sub-carriers BEING approximately constant. This condition holds in cases if channel coherent bandwidth is relatively large compared with transmission bandwidth. This is not as stringent as in space-time block coding, which has a fading channel on adjacent OFDM symbols as constant.

Without loss of generality, the 2k and (2k+1)th frequency-domain data(sub-carrier) signal pair is studied. The space-frequency decoding of this signal pair is simply given by the same combining scheme in [9]. Assume no phase noise exists, the combining rules are given by:

$$\hat{X}(2k) = Y_1(2k)H_{11}^*(2k) + Y_1^*(2k+1)H_{21}(2k) + \\ Y_2(2k)H_{12}^*(2k) + Y_2^*(2k+1)H_{22}(2k) \\ = X(2k)\sum_{t=1}^{2}\sum_{r=1}^{2}|H_{tr}(2k)|^2 + H_{11}^*(2k)N_1(2k) + H_{21}(2k)N_1^*(2k+1) + \\ H_{12}^*(2k)N_2(2k) + H_{22}(2k)N_2^*(2k+1) \quad (5)$$

$$\hat{X}(2k+1) = Y_1(2k)H_{11}^*(2k) - Y_1^*(2k+1)H_{21}(2k) \\ Y_2(2k)H_{12}^*(2k) - Y_2^*2(2k+1)H_{22}(2k) \\ = X(2k+1)\sum_{t=1}^{2}\sum_{r=1}^{2}|H_{tr}(2k)|^2 + \\ H_{21}^*(2k)N_1(2k) - H_{11}(2k)N_1^*(2k+1) + \\ H_{22}^*(2k)N_2^*(2k) - H_{12}(2k)N_2^*(2k+1) \quad (6)$$

The space diversities provided by both transmit and receive antennas are exploited by this combining scheme.

In this context, the term phase noise is used for describing short term random frequency fluctuations of a signal. It may result from transmitter and receiver oscillators and may be described as a continuous Brownian motion process with zero mean and variance $2\pi\beta t$, where $\beta$ denotes the phase noise linewidth, although claimed subject matter is not limited in scope in this respect. By including phase noise effect, the expression of (4) is subsequently modified to:

$$Y_r(k) = \sum_{t=1}^{2} H_{tr}(k)X_t(k)C(0) + \underbrace{\sum_{t=1}^{2}\sum_{n=0,n\neq k}^{N-1} H_{tr}(n)X_t(n)C(n-k)}_{ICI_{tr}(k)} + N_r(k) \quad (7)$$

$$\text{where } C(n) = \frac{1}{N}\sum_{k=0}^{N-1} e^{j2\pi kn + j0(k)}$$

with o(k) denoting the phase noise. The variance of o(k) is given by $2\pi\beta T$, where $\beta$ and T denote the phase noise linewidth and the OFDM symbol duration respectively. It is noticed from (7) that phase noise contributes to 1. Common phase error (CPE), indicated by C(0), which may result in the rotation of the desired signals;
2. Intercarrier interference (ICI), indicated by the term $ICI_r(k)$, which may result in interference on the desired signals.

With medium to small phase noise levels, post-DFT phase noise adjustment may in particular situations be possible. Typically, CPE amounts to over 90% phase noise energy while ICI is relatively small in comparison to CPE. That is, for frequency-domain correction, even though considering both CPE and ICI would yield better result, CPE correction may amount to the major performance loss due to phase noise. Furthermore, the spatial diversity provided by MIMO may also improve CPE estimator performance. Therefore, this particular embodiment addresses CPE, although, of course, claimed subject matter is not limited in scope to CPE estimation.

To mitigate CPE, (7) can be rewritten as $$Y_r(k) = \sum_{t=1}^{2} H_{tr}(k)X_t(k)C(0) + \acute{N}_r(k) \quad (8)$$

where $\acute{N}_r(k)$ denotes $\sum_{t=1}^{2}\sum_{n=0,n\neq k}^{N-1} H_{tr}(n)X_t(n)C(n-k) + N_r(k)$. Define $N_p$ as a number of pilots within an OFDM symbol, and $\{k_1, k_2, \ldots, k_{N_p}\}$ as the corresponding pilot set. Then the pilot art of the received signal in (8) is equivalent to (9) and (10) below:

$$\overline{Y} = SC(0) + \overline{\acute{N}}$$

$$\overline{Y} = [Y_1(k_1), Y_2(k_1), \ldots Y_1(k_{N_p}), Y_2(k_{N_p})]^T$$

$$S = [S_1(k_1), S_2(k_1), \ldots, S_1(k_{N_p}), S_2(k_{N_p})]^T$$

$$\overline{\acute{N}} = [\acute{N}_1(k_1), \acute{N}_2(k_1), \ldots, \acute{N}_1(k_{N_p}), \acute{N}_2(k_{N_p})]^T$$

$$S_r(k_p) = \sum_{t=1}^{2} H_{tr}(k_p)X_t(k_p) \quad 1 \leq p \leq N_p$$

For this particular embodiment, phase error may be estimated by estimating C(0). This may be accomplished here by finding an appropriate coefficient vector W which minimizes) $E[\|C(0) - W^H\overline{Y}\|^2]$. With some algebraic manipulation, it is readily shown that this coefficient here is given by:

$$W = \left(SS^H + \frac{\sigma^2}{E_c}I\right)^{-1} S \quad (11)$$

which gives rise to the MMSE estimate of CPE:

$$\hat{C}(0) = w^h\overline{Y} = S^H\left(SS^H + \frac{\sigma^2}{E_c}I\right)^{-1}\overline{Y} \quad (12)$$

where $E_C$ denotes the average energy of C(0), an $\sigma^2$ denotes the variance of $\acute{N}_r(k)$. Assuming perfect knowledge of the phase noise linewidth and channel response, and the OFDM subcarrier signals are mutually independent random variables with zero mean and variance $E_x$. Then the statistics of $E_C$ and $N_r(k)$ are shown to be:

$$E_c = E[|C(0)|^2] = 1 - \frac{\pi\beta T}{3} \quad (13)$$

$$\sigma^2 = \text{VAR}[\acute{N}_T(k)] \quad (14)$$

$$= \sum_{t=1}^{2} E[|ICI_{tr}(k)|^2] + \sigma_N^2$$

$$= \frac{2\pi\beta T E_x}{3} + \sigma_N^2$$

where we assumed channel response is normalized and phase noise is independent to AWGN. Note that larger number of pilots $N_p$ increases the size of vector W, and improves the estimation accuracy. Spacial diversity is exploited in this scheme, since the length of W will reduce to half in single antenna systems.

When considering the CPE effect of phase noise, the decision results in (5) and (6) are modified by multiplying the corresponding channel responses by C(0). Then after estimation of CPE, we have:

$$\hat{X}(2k) = X(2k)|\hat{C}(0)|^2 \sum_{t=1}^{2}\sum_{r=1}^{2} 2|H_{tr}(2k)|^2 + \quad (15)$$
$$\hat{C}^*(0)[H_{11}^*(2k)N_1(2k) + H_{21}(2k)N_1^*(2k+1)] +$$
$$\hat{C}^*(0)[H_{12}^*(2k)N_2(2k) + H_{22}(2k)N_2^*(2k+1)]$$

$$\hat{X}(2k+1) = X(2k+1)|\hat{C}(0)|^2 \sum_{t=1}^{2}\sum_{r=1}^{2}|H_{tr}(2k)|^2 + \quad (16)$$
$$\hat{C}^*(0)[H_{21}^*(2k)N_1(2k) - H_{11}(2k)N_1^*(2k+1)] +$$
$$\hat{C}^*(0)[H_{22}^*(2k)N_2^*(2k) - H_{12}(2k)N_2^*(2k+1)]$$

As suggested previously, simulations were carried out for the IEEE 802.11a standard, with 64 sub-carriers for an OFDM symbol, and the space-frequency diversity technique was applied, wherein 16QAM modulation is used. The length of cyclic prefix is assumed to be larger than channel delay spread.

Figure 2:
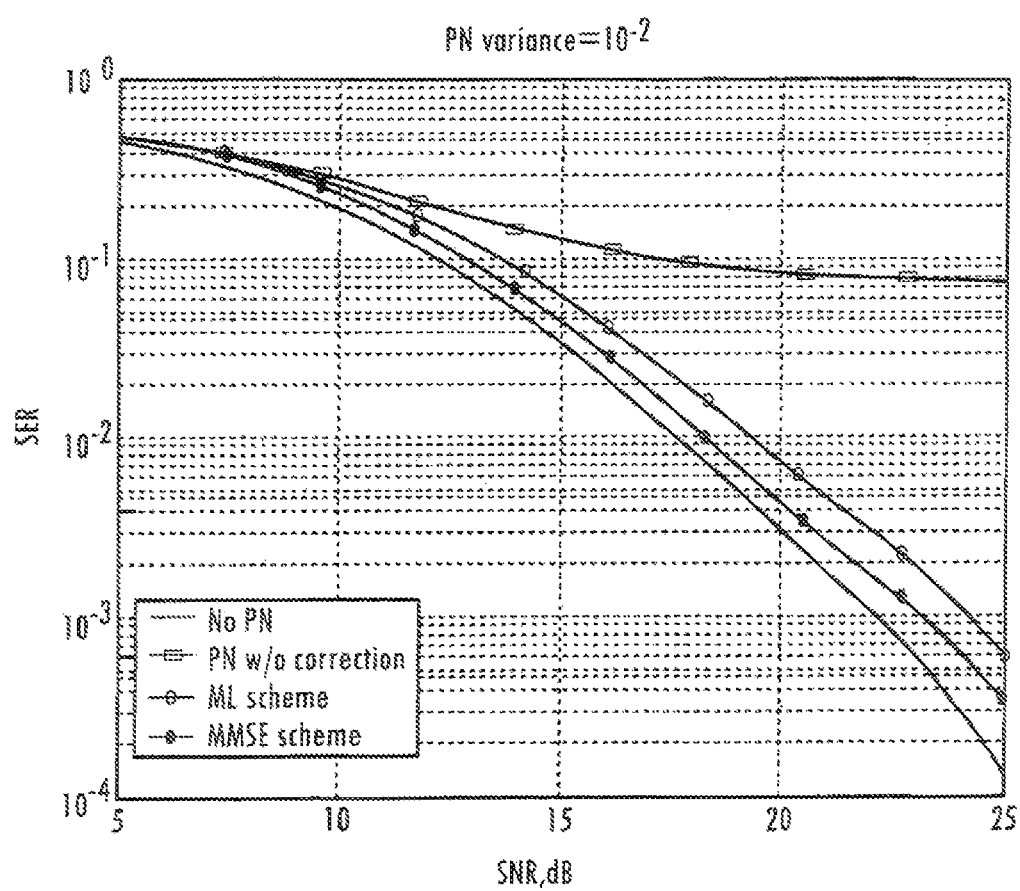
FIGS. 2-5 are plots illustrating simulated performance results of employing various embodiments of a method of estimating phase error noise.

FIG. 2 shows the SER performance of an embodiment of a method of estimating phase error noise in comparison to no-phase-noise and phase-noise-without-correction cases. Even for small phase noise of $10^{-2}$ with no correction, there is an apparent error floor. On the other hand, the particular embodiment applied here mitigates phase noise and performance therefore stays close to no-phase-noise case. Notice that even an ML-based scheme is 1-2 dB worse than the particular embodiment.

Figure 3:
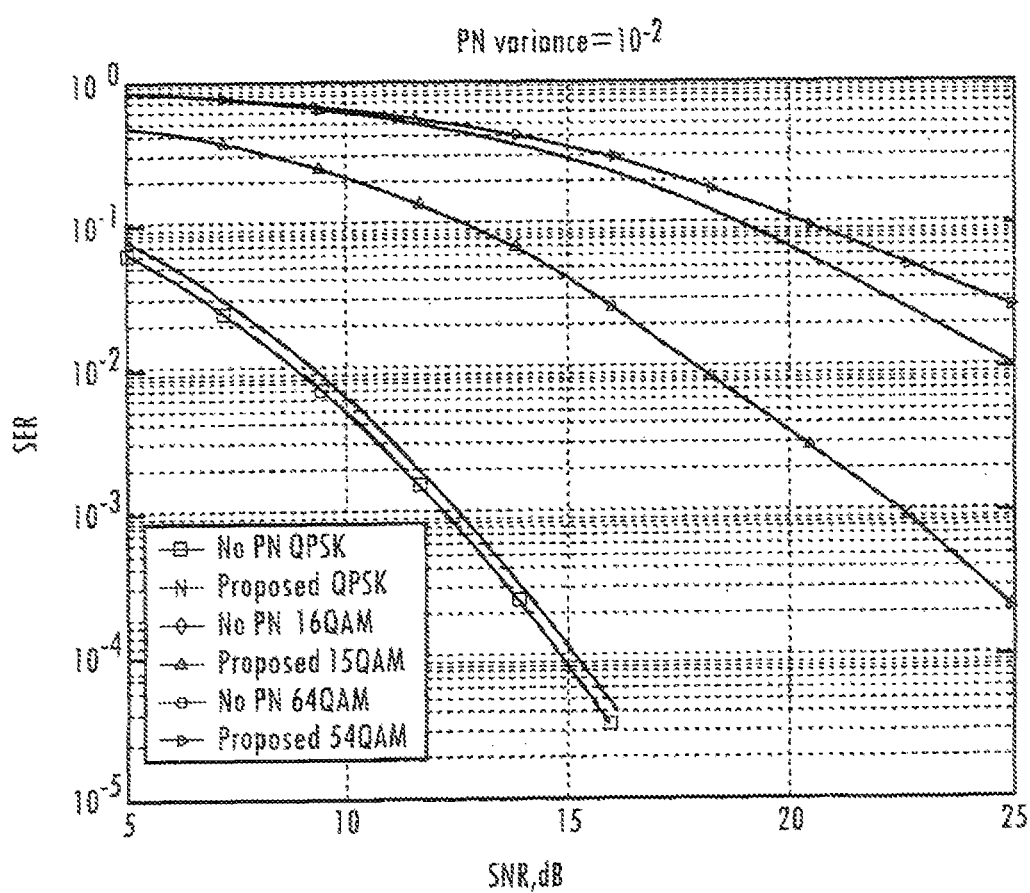

Effect of different modulation on the proposed scheme is evaluated in FIG. 3, which shows that this particular embodiment is robust for common modulation methods. Also notice that the performance difference between an embodiment and no-phase-noise case becomes larger when the constellation size increases, as the larger constellation is more sensitive to estimation errors.

Figure 4:
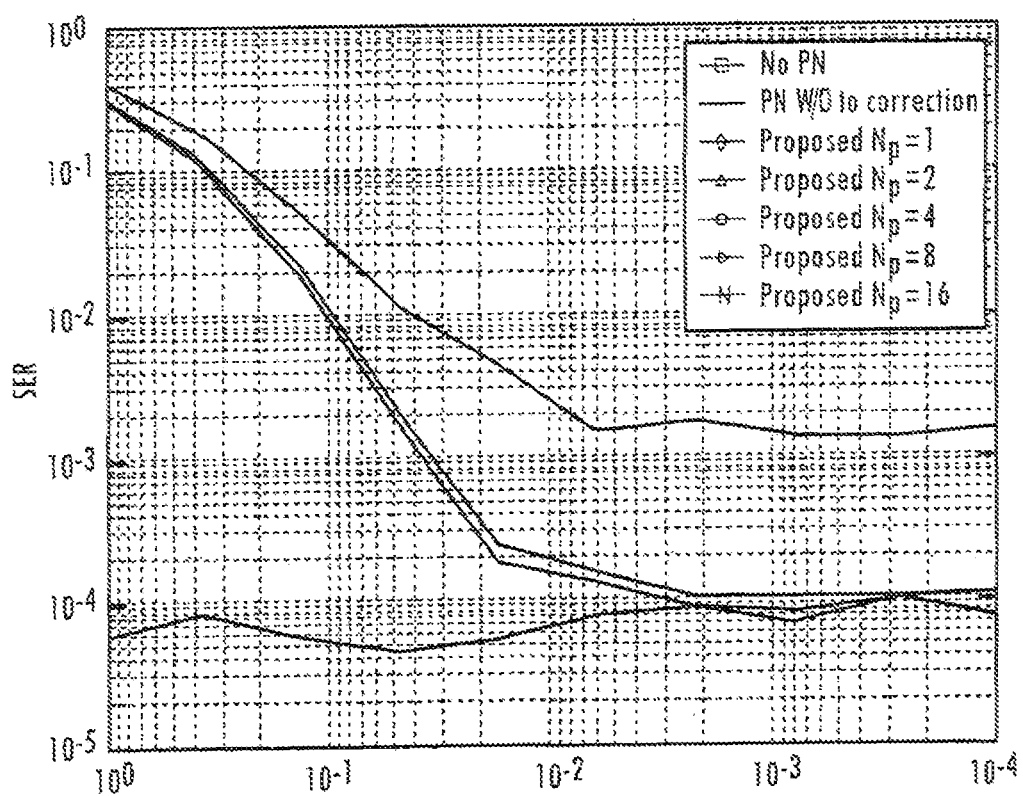

FIG. 4 shows the effect of a number of pilots and phase noise level, on the SER performance of the system. From this figure, we conclude that choosing 4 pilots gives adequate performance with high spectral efficiency (4/64=6.25% transmission bandwidth for pilots) and relatively low computational complexity.

Figure 5:
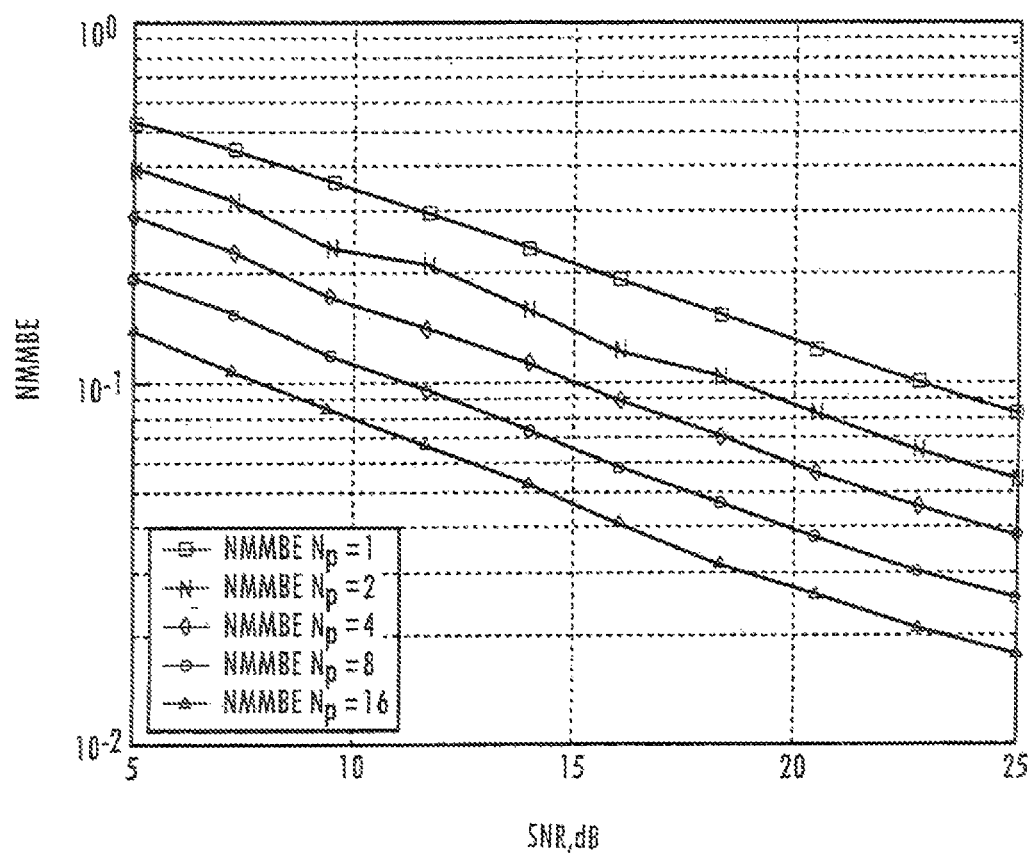

Finally, in FIG. 5, the normalized MMSE (NMMSE) is used to compare the performance with different $N_p$. Notice that although we can improve the estimation error, NMMSE, by larger $N_p$, the same amount improvement does not occur for SER, as it is shown in FIG. 4.

It is worth noting that embodiments of claimed subject matter may be employed in a variety of contexts and claimed subject matter is not limited in scope in this respect. For example, embodiments may be employed in a variety of possible communication devices, including, for example, cell phones, personal digital assistants, laptop computers, media players, and the like. Of course, claimed subject matter is not limited in scope to this example. Many other approaches and/or other types of devices employing a variety of software, firmware and/or hardware are possible and included within the scope of claimed subject matter.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of reducing phase error noise for a receiver employing an MIMO-OFDM scheme comprising:
    obtaining a minimum mean-square error (MMSE) estimate of common phase error; and
    adjusting a received signal for a common phase error component of phase noise based on the MMSE estimate of common phase error.

2. The method of claim 1, wherein said adjusting a received signal comprises adjusting decoding of said received signal.

3. The method of claim 1, wherein said MIMO-OFDM scheme employs space-time coding.

4. The method of claim 1, wherein said adjusting a received signal comprises performing frequency-domain correction for the common phase error component of phase noise.

5. An apparatus comprising:
    a receiver employing an MIMO-OFDM scheme;
    said receiver adapted to form a minimum mean-square error (MMSE) estimate of common phase error and further adapted to adjust a received signal for a common phase error component of phase noise based on said MMSE estimate of common phase error.

6. The apparatus of claim 5, wherein said receiver is further adapted to adjust decoding of the received signal.

7. The apparatus of claim 5, wherein said receiver is adapted to receive a signal that employs space-time coding.

8. The apparatus of claim 5, wherein said receiver is substantially compliant with aspects of IEEE 802.11.

9. The apparatus of claim 5, wherein said receiver is incorporated in at least one of the following:
a cell phone;
a personal digital assistant;
a laptop computer;
a media player device.

10. The apparatus of claim 5, wherein said receiver is adapted to adjust the received signal by performing frequency-domain correction for the common phase error component of phase noise.

11. An apparatus comprising:
a computing device;
said computing device adapted to form a minimum mean-square error (MMSE) estimate of common phase error for an MIMO-OFDM communication scheme, wherein said computing device is further adapted to process received signals so as to adjust for a common phase error component of phase error noise based on said MMSE estimate of common phase error.

12. The apparatus of claim 11, wherein said computing device is further adapted to adjust decoding of received signals.

13. The apparatus of claim 11, wherein said computing device is adapted to operate on signals that employ space-time coding.

14. The apparatus of claim 11, wherein said computing device is substantially compliant with aspects of IEEE 802.11.

15. The apparatus of claim 11, wherein said computing device is incorporated in at least one of the following:
a cell phone;
a personal digital assistant;
a laptop computer;
a media player device.

16. The apparatus of claim 11, wherein said computing device is further adapted to adjust the received signal by performing frequency-domain correction for the common phase error component of phase noise.

17. An apparatus including a computer-readable storage medium having stored thereon instructions that, upon execution by a computing device associated with the apparatus, cause the apparatus to perform actions comprising:
obtaining a minimum mean-square error (MMSE) estimate of common phase error associated with a received multiple-input multiple-output orthogonal frequency-division multiplex (MIMO-OFDM) signal; and
adjusting the received signal for a common phase error component of phase noise based on the MMSE estimate of common phase error.

18. The apparatus of claim 17, wherein said MIMO-OFDM scheme employs space-time coding.

19. The apparatus of claim 17, wherein said adjusting a received signal comprises performing frequency-domain correction for the common phase error component of phase noise.

* * * * *